United States Patent
De'Longhi et al.

(10) Patent No.: US 11,684,202 B2
(45) Date of Patent: Jun. 27, 2023

(54) COLLECTION TRAY FOR DISCHARGED LIQUID/STEAM OF A COFFEE MACHINE THAT INCORPORATES SAID COLLECTION TRAY

(71) Applicant: De'Longhi Appliances S.R.L., Treviso (IT)

(72) Inventors: Giuseppe De'Longhi, Treviso (IT); Nicola Nicoletti, Treviso (IT); Paolo Evangelisti, Treviso (IT)

(73) Assignee: De'Longhi Appliances S.R.L., Treviso (IT)

( * ) Notice: Subject to any disclaimer, the term of this patent is extended or adjusted under 35 U.S.C. 154(b) by 273 days.

(21) Appl. No.: 16/963,284

(22) PCT Filed: Feb. 28, 2019

(86) PCT No.: PCT/EP2019/054961
§ 371 (c)(1),
(2) Date: Jul. 20, 2020

(87) PCT Pub. No.: WO2019/170508
PCT Pub. Date: Sep. 12, 2019

(65) Prior Publication Data
US 2021/0045573 A1     Feb. 18, 2021

(30) Foreign Application Priority Data

Mar. 5, 2018   (IT) ...................... 102018000003262

(51) Int. Cl.
*A47J 31/44*     (2006.01)
(52) U.S. Cl.
CPC ....... *A47J 31/4428* (2013.01); *A47J 31/4457* (2013.01)

(58) Field of Classification Search
CPC .. A47J 31/4457; A47J 31/4428; G01F 23/246
(Continued)

(56) References Cited

U.S. PATENT DOCUMENTS

| 4,591,839 A * | 5/1986 | Charboneau | G01F 23/246 |
| | | | 73/304 R |
| 6,766,729 B2 * | 7/2004 | Rolland | A47J 31/4482 |
| | | | 99/279 |

(Continued)

FOREIGN PATENT DOCUMENTS

| DE | 10330734 A1 | 2/2005 |
| EP | 3153077 A1 | 4/2017 |

OTHER PUBLICATIONS

International Search Report dated May 8, 2019; International Application No. PCT/EP2019/054961; International Filing Date: Feb. 28, 2019; 3 pages.

(Continued)

*Primary Examiner* — Eric S Stapleton
(74) *Attorney, Agent, or Firm* — Blank Rome LLP

(57) ABSTRACT

The collection tray (1) for discharged liquid/steam of a coffee machine (2) comprises a primary collection compartment (10), a secondary collection compartment (11), an overflow (12) of the primary collection compartment (10) for discharging the liquid into the secondary collection compartment (11), and at least two electrical conductors (13) positioned in the secondary collection compartment (11) and assembled on an oscillating support (14) for connection with two contacts (15) of an external electrical circuit for detecting the level of the liquid present in the secondary collection compartment (11).

18 Claims, 5 Drawing Sheets

(58) Field of Classification Search
USPC .......................... 99/279; 340/620; 73/304 R
See application file for complete search history.

(56) References Cited

U.S. PATENT DOCUMENTS

| | | | | |
|---|---|---|---|---|
| 7,182,017 | B1* | 2/2007 | Knepler | A47J 31/467 99/279 |
| 7,997,187 | B2* | 8/2011 | Garman | A47J 31/58 99/304 |
| 9,198,536 | B2* | 12/2015 | Lardelli | B67D 1/16 |
| 2008/0226783 | A1* | 9/2008 | Lavie | A23L 2/54 99/279 |
| 2009/0236364 | A1* | 9/2009 | Njaastad | B67D 1/16 29/428 |
| 2010/0326282 | A1* | 12/2010 | Carbonini | A47J 31/56 73/304 C |
| 2012/0186457 | A1* | 7/2012 | Ozanne | A47J 31/4428 99/287 |
| 2013/0036815 | A1* | 2/2013 | Bernhardsgruetter | A47J 31/52 137/551 |
| 2014/0305927 | A1* | 10/2014 | Alexander | A47J 31/4417 62/3.1 |
| 2014/0352802 | A1* | 12/2014 | Lardelli | B67D 1/16 137/312 |
| 2015/0245723 | A1* | 9/2015 | Alexander | A47J 39/025 219/387 |
| 2017/0042373 | A1* | 2/2017 | Alexander | F25D 3/08 |

OTHER PUBLICATIONS

Written Opinion dated May 8, 2019; International Application No. PCT/EP2019/054961; International Filing Date: Feb. 28, 2019; 5 pages.
English translation; German Published Application No. DE10330734; Publication Date: Feb. 17, 2005; 11 pages.
English translation; European Published Application No. EP3153077; Publication Date: Apr. 12, 2017; 16 pages.

* cited by examiner

COLLECTION TRAY FOR DISCHARGED LIQUID/STEAM OF A COFFEE MACHINE THAT INCORPORATES SAID COLLECTION TRAY

RELATED APPLICATIONS

This application is a U.S. national phase application of International Application No. PCT/EP2019/054961, filed Feb. 28, 2019; which application claims benefit of priority of Italy Application No. 102018000003262, filed Mar. 5, 2018. Each of the above-identified related applications are incorporated by reference.

FIELD OF USE

The present invention relates to a collection tray for discharged liquid/steam and to a coffee machine that incorporates said collection tray.

BACKGROUND OF THE INVENTION

Coffee machines are known having a removable tray where the discharged water and/or steam is collected.

For this reason, the tray provides a connector that sealingly connects the tray to a water/steam discharge conduit of the coffee machine.

The collection tray is positioned at the base of the front wall of the coffee machine and has a cover acting as a cup resting plane.

The tray is removed whenever it has to be emptied and cleaned.

Generally, the tray is provided with a level sensor that, when a certain threshold is reached, generates an electric signal that is processed to warn the user.

The sensor in general provides two electrical conductors positioned in the tray at a distance from the bottom.

When the level of the liquid rises and comes into contact with the two electrical conductors, it automatically closes the electric signalling circuit present in the machine.

When the tray is connected to the machine, it is necessary to make sure that the electrical conductors of the sensor present in the tray engage correctly the electrical contacts of the electric signalling circuit present in the machine.

The correct connection of the tray to the coffee machine thus implies both the correct fluid sealed mechanical connection to the water/steam discharge conduit and the correct electrical connection to the electric signalling circuit.

Sometimes, the tray has slight deformations that are for example due to shrinkage of material during the moulding step, that complicate the execution of the correct hydraulic and electrical connection to the coffee machine.

In certain situations in which the connection between the parts is forced by hand, other small deformations are generated that may contribute to modifying the height position of the electrical conductors present in the tray, with the inevitable consequence that the level threshold at which the signalling circuit is tripped may vary without precise control.

SUMMARY OF THE INVENTION

The technical task of the present invention is therefore to make a removable collection tray and a coffee machine incorporating said collection tray that make it possible to eliminate the cited technical drawbacks of the prior art.

In the context of this technical task, one object of the invention is to make a collection tray that can be electrically and hydraulically connected correctly to the coffee machine without particular difficulties.

Another object of the invention is to make a coffee machine that is able to supply a repeatable and precise measurement of a predetermined threshold limit of the liquid present in the tray.

The technical task, and these and other objects, according to the present invention are achieved by making a collection tray for discharged liquid/steam of a coffee machine, characterised in that it comprises a primary collection compartment, a secondary collection compartment, an overflow of said primary collection compartment for discharging the liquid into the secondary collection compartment, and at least two electrical conductors positioned in said secondary collection compartment and assembled on an oscillating support for connection with two contacts of a detection electrical circuit for detecting the liquid level present in said secondary collection compartment.

The invention also discloses a coffee machine that incorporates the collection tray in an extractable manner.

Preferably, said conductors are positioned at the same height in said secondary collection compartment.

Preferably, the coffee machine has a housing for said conductors where said contacts are present.

Preferably, said support is subjected to an elastic strain towards a stroke end.

Preferably, said contacts are provided on elastically yielding metal elements that stress said support to said stroke end.

Preferably, said stroke end is a wall of said housing.

Preferably, said oscillating support is guided in a vertical oscillation direction.

Preferably, said metal conductors are shaped sheets comprising an end that extends into said secondary collection compartment and an end extends into said housing.

Preferably, said oscillating support is in turn assembled on a structurally independent frame.

Preferably, said frame has wave breaker walls that extend inside said primary collection compartment.

Preferably, said tray comprises a cup resting plane positioned on an open upper side thereof.

Preferably, said tray has a connector for sealed connection of said primary collection compartment to a water/steam discharge conduit of said coffee machine.

Preferably, said connector is integrated into said frame.

BRIEF DESCRIPTION OF THE DRAWINGS

Further characteristics and advantages of the invention will more fully emerge from the description of a preferred but not exclusive embodiment of the collection tray of the coffee machine, which incorporates the tray according to the invention, illustrated by way of non-limiting example in the accompanying drawings, in which.

DETAILED DESCRIPTION OF THE ILLUSTRATED EMBODIMENTS

Figure 1:
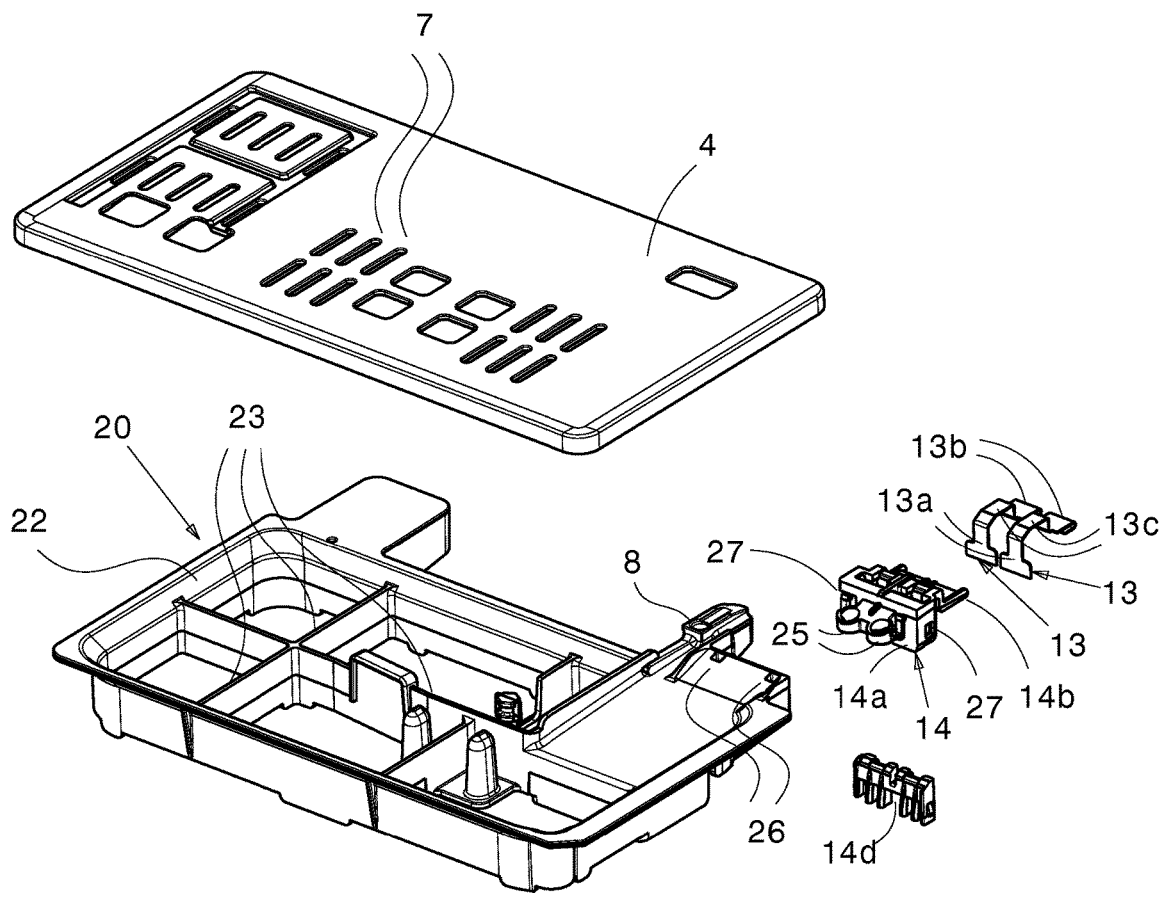
FIG. 1 shows an exploded view of the collection tray and of the components supported thereby.
Figure 1:
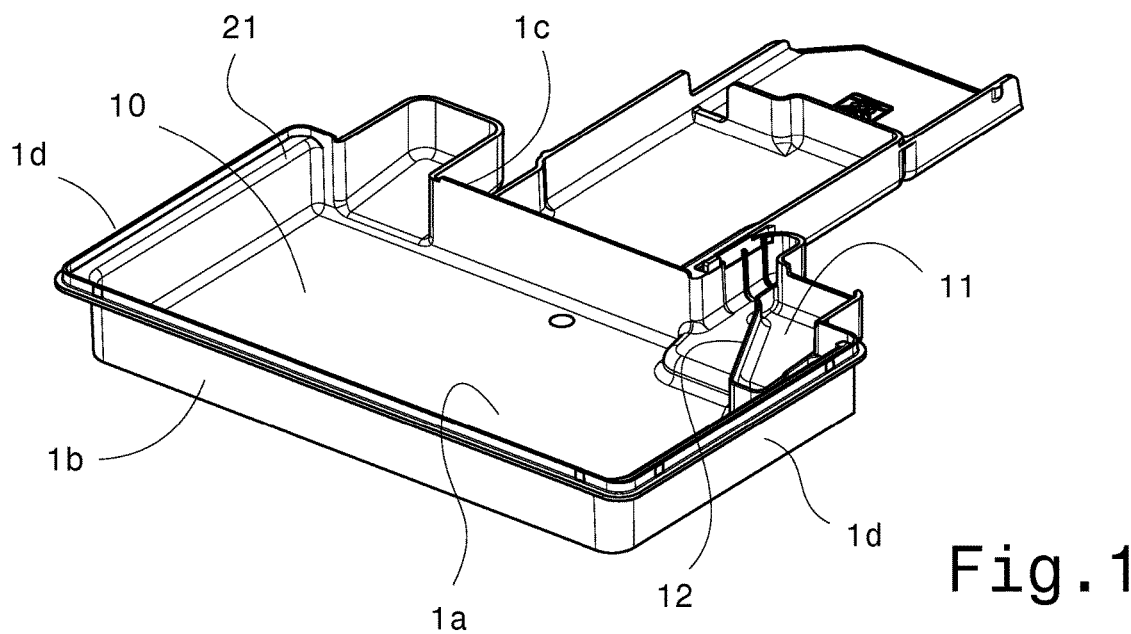
Figure 2:
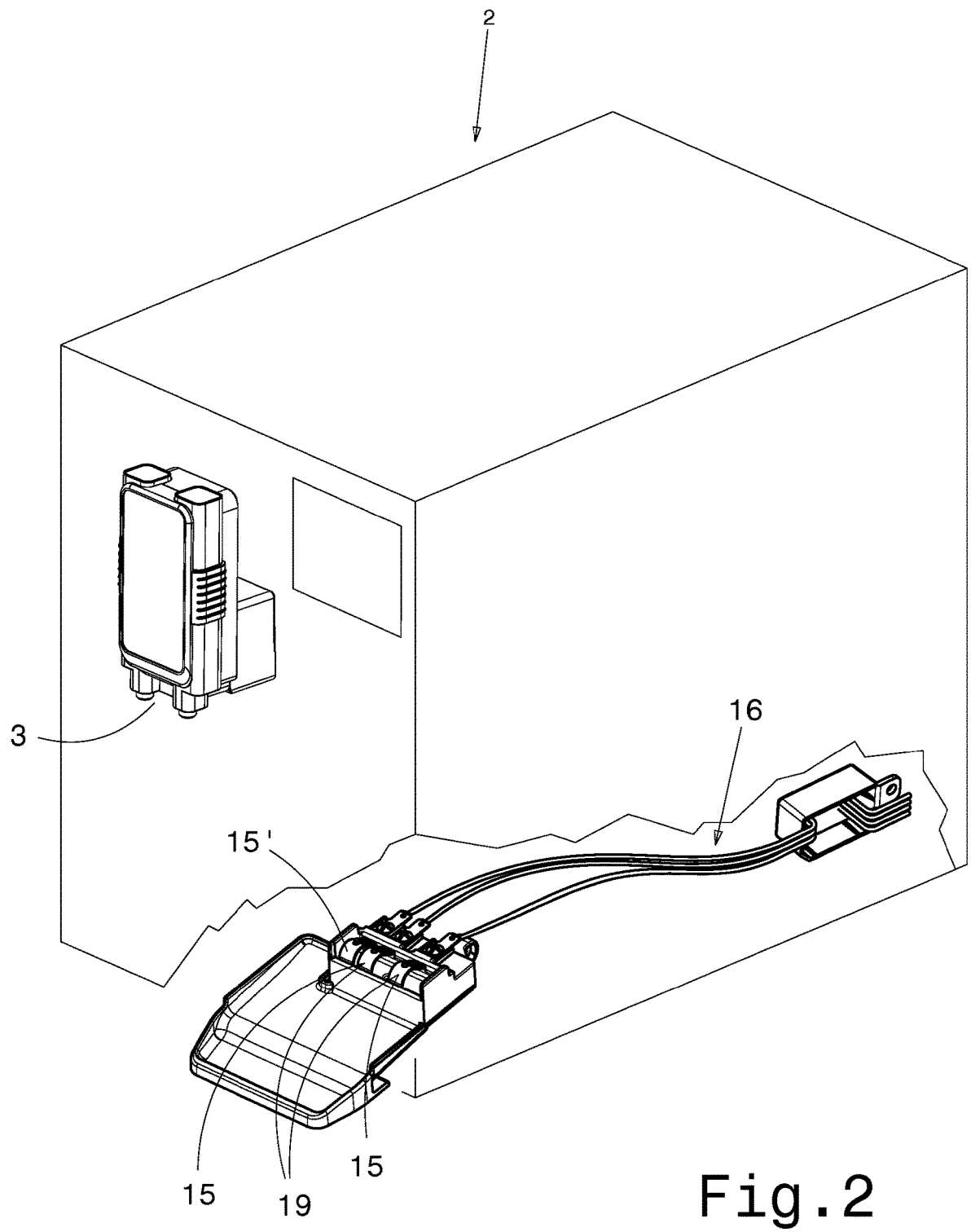
FIG. 2 shows a schematic view of the coffee machine.
Figure 3:
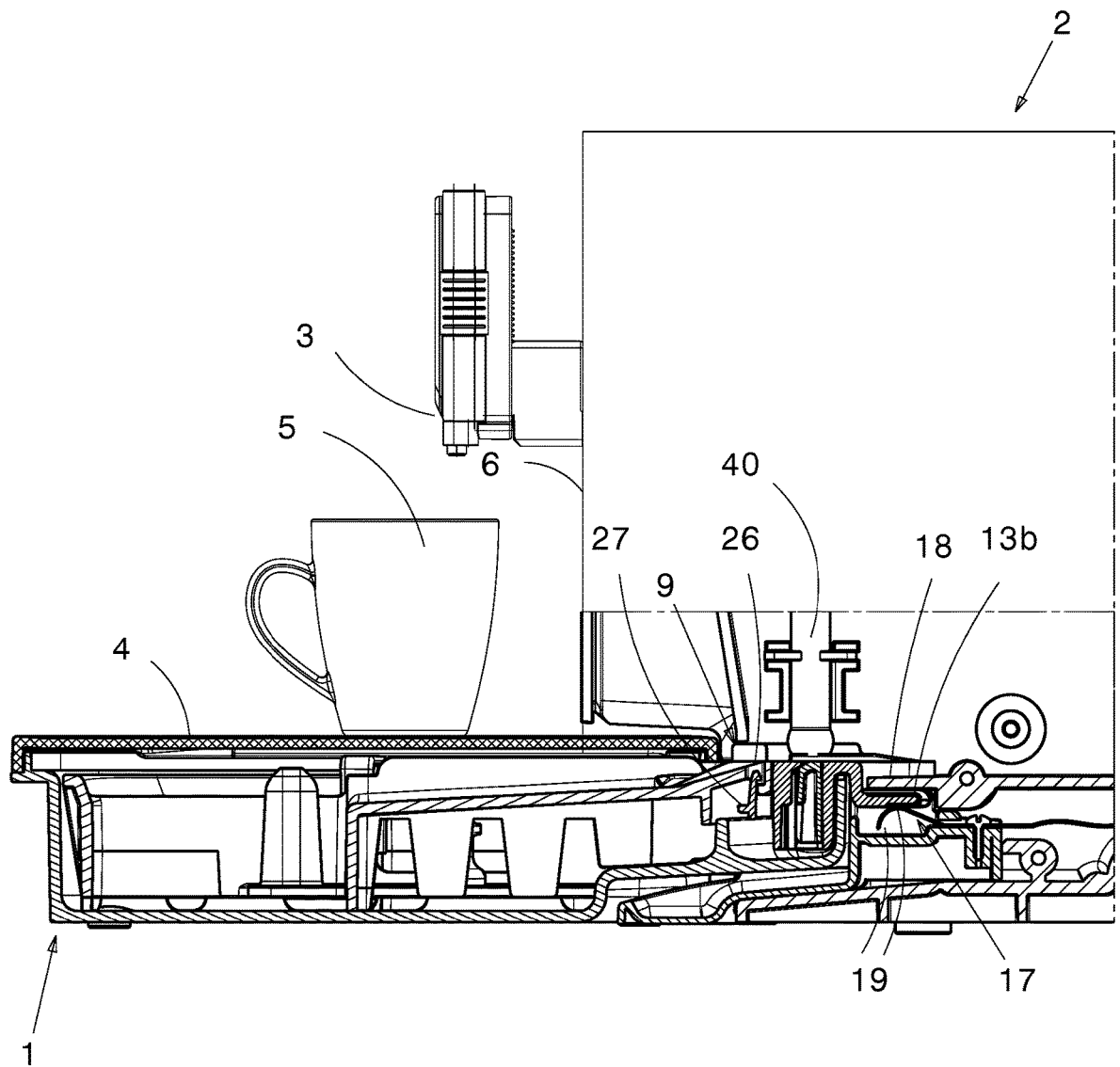
FIG. 3 shows a lateral raised view of the collection tray in a vertical section connected to the coffee machine.
Figure 4:
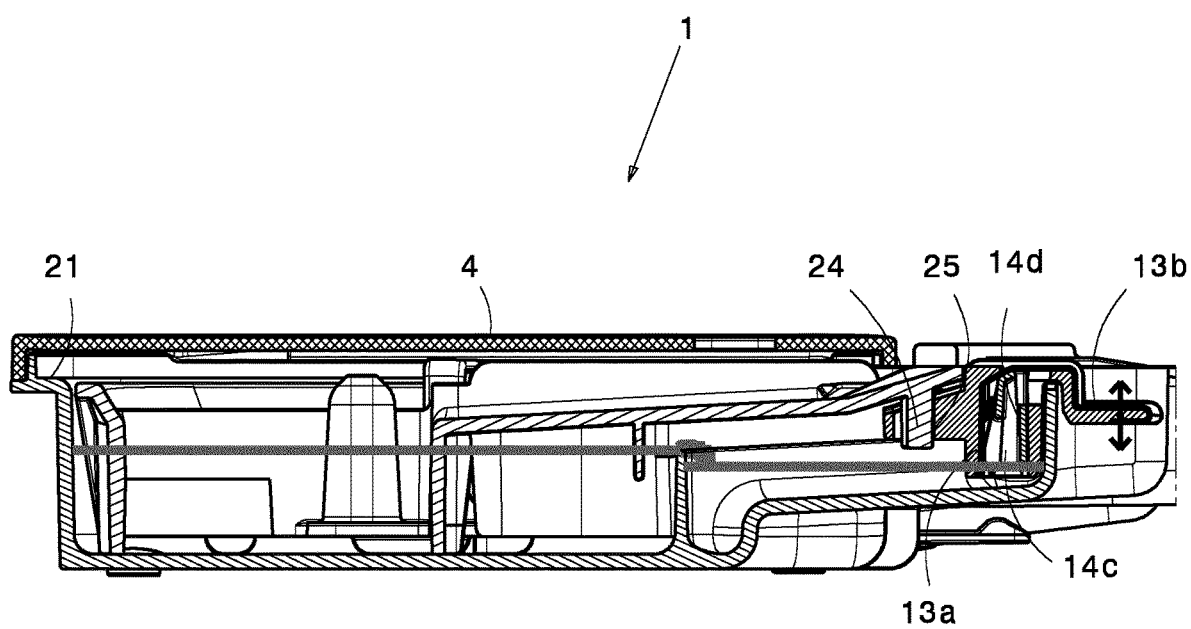
FIG. 4 shows a lateral raised view of the collection tray in a vertical section.
Figure 5:
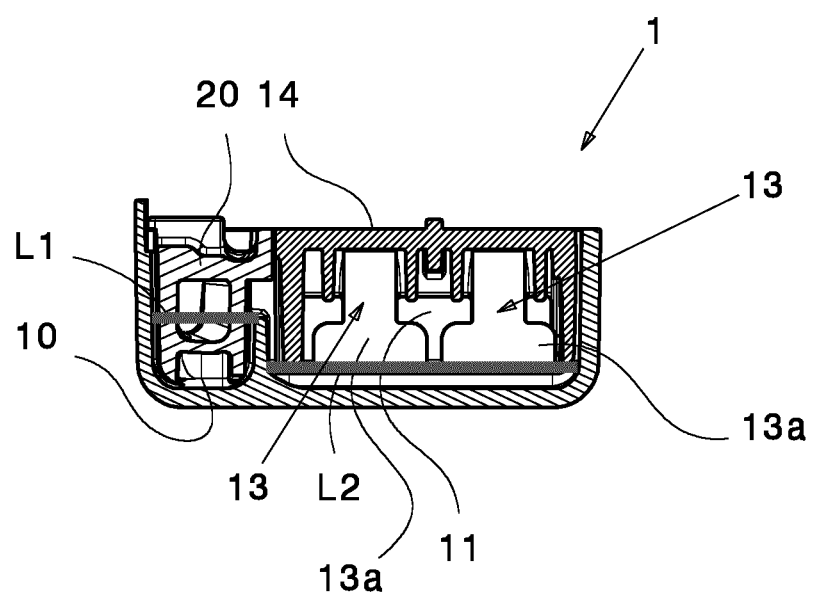
FIG. 5 shows a front view of the tray in a vertical section.

With reference to the figures mentioned, a coffee machine 2 is shown that has at the front an extractable collection tray 1 for the discharged liquid/steam produced by the coffee machine 2.

The collection tray 1 in particular is positioned at the base of the front wall 6 of the frame of the coffee machine 2.

The collection tray 1 has a main body formed by a bottom 1a, a front wall 1b, a back wall 1c and sides 1d that bound an open upper side.

The coffee machine 2 comprises in a known manner a hydraulic circuit (not shown) comprising a water tank, a feed pump, at least one boiler that is able to generate hot water/steam and a brewing unit.

The brewing unit is connected to an external dispenser 3 that extends in front of the front wall 6 of the frame of the coffee machine 2 at a certain height above a resting plane 4 for resting the cups 5, which resting plane 4 is positioned to cover the open upper side of the collection tray 1.

The cup resting plane 4 has slits 7 to permit draining into the tray 1 of the residual drops of coffee that are possibly exiting the external dispenser 3 at the end of the dispensing cycle.

The tray 1 has a rear portion engaged in a space 9 that opens at the base of the front wall 6 of the frame of the coffee machine 2.

The tray 1 is connected by form coupling with the space 9 from which it is guidingly extracted with a horizontal translation movement in a rear-front direction.

The tray 1 has, at its rear portion, a connector 8 that is vertically connected in a sealed connection with a water/steam discharge conduit 40 above present in the coffee machine 1.

Water/steam that remains in the brewing unit generally flows into the discharge conduit 40 of the coffee machine 2 and into the connected circuits at the end of the normal dispensing cycle.

Also water/steam can possibly flow into the discharge conduit of the coffee machine 2 that circulate in a washing cycle of the inner components of the coffee machine or of accessories that are connectable to the coffee machine, such as for example milk emulsifiers for producing cappuccino or latte.

The collection tray 1 comprises a primary collection compartment 10, a secondary collection compartment 11, an overflow 12 of the primary collection compartment 10 for discharging the liquid into the secondary collection compartment 11, and at least two electrical conductors 13 positioned in the secondary collection compartment 11.

The secondary collection compartment 11 extends at least partially into the rear portion of the collection tray 1 and has a volume that is noticeably less than that of the primary collection compartment 10.

The two electrical conductors 13 are assembled on an oscillating support 14 for connection with two electrical contacts 15 of a detection electrical circuit 16 for detecting the liquid level present in the secondary collection compartment 11.

The two electrical contacts 15 are positioned in a housing 17 of the space 9 where the two electrical conductors 13 are inserted.

Other contacts 15' can be inserted into the housing 17, which contacts 15' are for example used to activate a signalling circuit for signalling the presence of the tray 1.

The oscillating support 14 is guided in a vertical oscillation direction.

The two electrical conductors 13, which are constrained stiffly on the oscillating support 14, are arranged at the same height in the secondary collection compartment 11.

The support 14 is subjected to an elastic strain towards a stroke end 18 present in a coffee machine 2.

In particular, the two contacts 15 are provided on elastically yielding metal elements 19 that stress the support 14 towards the stroke end 18.

The support 14 is subjected to a vertical elastic strain that always arranges the support 14 at a predetermined height and consequently always arranges the electrical conductors 13 at a predetermined height in the secondary collection compartment 11.

The stroke end 18 in the case illustrated is a wall of the housing 17, in particular the roof of the housing 17.

The electrical conductors 13 are shaped sheets comprising a front end 13a that extends vertically into the secondary collection compartment 11 and a rear end 13b that surmounts the secondary collection compartment 11 and extends into the housing 17.

The oscillating support 14 has a primary body 14a placed in the secondary collection compartment 11 and a rear horizontal wing 14b that surmounts the secondary collection compartment 11 and extends into the housing 17.

The primary body 14a has in turn a through vertical central space 14c in which a cap 14d is housed.

The metal conductors 13 have an intermediate portion 13c interposed between the cap 14d and the wall of the space 14c, the front end 13a extending below the primary body 14a, and the rear end 13b wound around the rear horizontal wing 14b.

The lower part of the rear end 13 of the metal conductors 13 is adapted to interacting with the corresponding electrical contact 15 below.

The cap 14 also has the function of breaking the waves that may be created in the secondary collection compartment 11.

The collection tray 1 has a frame 20 on which the oscillating support 14 is assembled.

The frame 20 is structurally independent of the main body of the collection tray 1.

The frame 20 has one or more vertical guide pins 24 on which specific through vertical holes are placed slidably 25 that are obtained at the front in the primary body 14a of the oscillating support 14, and of the retaining seats 26 to which they are hooked with the possibility of vertical sliding of the snap-fit teeth 27 that also extend from the primary body 14a of the oscillating support 14.

The frame 20 has a rest frame 22 on a perimeter shoulder 21 of the main body of the collection tray 1, and of the wave breaker walls 23 that extend inside the primary collection compartment 10.

The connector 8 is preferably integrated directly into the frame 20.

The advantage of the invention lies in the fact that the position of the metal conductors 13 is not stiffly connected to the position of the connector 8.

Then, when the collection tray 1 is introduced into the space 9 to connect the collection tray 1 electrically and hydraulically to the coffee machine 2, when the correct position of the connector 8 has been found also the electrical conductors 13 find the correct position through the effect of the settling of the position of the oscillating support 14 induced by the upward vertical elastic force with which the electrical contacts 15 push the electrical conductors 13 against the stroke end 18.

On the other side, the end position of the electrical conductors 13 will always be the same, so that recognition of the threshold level of the water in the secondary collection compartment 11 is always guaranteed.

The operation of the collection tray 1 is as follows.

Once level L1 is reached in the primary collection compartment 10, the liquid starts to overflow from the overflow 12 and enter the secondary collection compartment 11, which, having limited capacity, causes a rapid increase in level to a value L2 at which the electrical conductors 13 are licked by the liquid, which thus closes the electrical circuit 16.

The electrical circuit 16 generates a signal that is perceptible to the user, for example a message on the display from the coffee machine 2.

At this point the user extracts the collection tray 1 from the coffee machine 2, removes the cup resting plane 4 from the main body of the collection tray 1, possibly also removes the frame 20 from the main body of the collection tray 1 and empties the liquid contained in the main body of the collection tray 1.

The cup resting plane 4, the frame 20 and the main body of the collection tray 1, being structurally independent elements, can be handled singly for cleaning.

The collection tray and the coffee machine that incorporates the collection tray as conceived herein are susceptible to many modifications and variations, all falling within the scope of the inventive concept; further, all the details are replaceable by technically equivalent elements.

In practice the materials used, as well as the dimensions, can be any according to the needs and the state of the art.

The invention claimed is:

1. A coffee machine (2) comprising:
   an enclosure;
   a collection tray (1) for discharged liquid/steam of the coffee machine (2), the collection tray (1) comprising:
   a primary collection compartment (10);
   a secondary collection compartment (11);
   an overflow (12) of said primary collection compartment (10) for discharging the liquid into the secondary collection compartment (11);
   at least two electrical conductors (13) positioned in said secondary collection compartment (11) and assembled on an oscillating support (14) and configured for connection with two electrical contacts (15) of an electric circuit (16) of the coffee machine (2) for detecting a level of liquid contained in said secondary collection compartment (11); and
   a hydraulic connector (8) configured for sealed connection with an external water/steam discharge conduit (40) of the coffee machine (2);
   wherein the oscillating support (14) is configured for vertical oscillation to enable a position of the two electrical conductors (13) to be movable relative to a position of the hydraulic connector (8); and
   a dispenser (3) that extends from a wall of the enclosure, above the collection tray (1).

2. The coffee machine (2) according to claim 1, wherein said electrical conductors (13) are positioned at a same height in said secondary collection compartment (11).

3. The coffee machine (2) according to claim 1, further comprising a housing (17) for said electrical conductors (13) where said electrical contacts (15) are present.

4. The coffee machine (2) according to claim 1, wherein said electrical conductors (13) are positioned at a predetermined height in said secondary collection compartment (11) due to said oscillating support (14) being subjected to an elastic strain towards a stroke end (18).

5. The coffee machine (2) according to claim 4, wherein said electrical contacts (15) are provided on elastically yielding metal elements (19) that strain said oscillating support (14) towards said stroke end (18).

6. The coffee machine (2) according to claim 5, wherein said stroke end (18) is a wall of a housing (17) for said electrical conductors (13) where said electrical contacts (15) are present.

7. The coffee machine (2) according to claim 6, wherein said electrical conductors (13) are shaped sheets comprising one end (13*a*) that extends into said secondary collection compartment (11) and one end (13*b*) that extends into said housing (17).

8. The coffee machine (2) according to claim 1, wherein said oscillating support (14) is guided in a vertical oscillation direction.

9. The coffee machine (2) according to claim 1, wherein said oscillating support (14) is assembled on a structurally independent frame (20) of the collection tray (1), where the structurally independent frame (20) is structurally independent of a main body of the collection tray (1).

10. The coffee machine (2) according to claim 9, wherein said frame (20) has wave breaker walls (23) that extend into said primary collection compartment (10).

11. The coffee machine (2) according to claim 9, wherein said hydraulic connector (8) is configured for sealed connection of said primary collection compartment (10) to said water/steam discharge conduit (40) of said coffee machine (2).

12. The coffee machine (2) according to claim 11, wherein said hydraulic connector (8) is integrated into said frame (20).

13. The coffee machine (2) according to claim 1, wherein said collection tray (1) comprises a structurally independent cup resting plane (4), where the structurally independent cup resting frame (4) is structurally independent of a main body of the collection tray (1).

14. The coffee machine (2) according to claim 1, wherein the primary collection compartment (10), the secondary collection compartment (11), and the overflow (12) are configured so that:
   upon liquid reaching a predetermined level in the primary collection compartment (10), the liquid starts to overflow from the overflow (12) into the secondary collection compartment (11); and
   upon liquid reaching a predetermined level in the secondary collection compartment (11), the two electrical conductors (13) are contacted by the liquid, which closes the electric circuit (16).

15. The coffee machine (2) according to claim 1, wherein the secondary collection compartment (11) is smaller in volume than the primary collection compartment (10), and all liquid drainage and drippings of the coffee machine (2) first enter the primary collection compartment (10).

16. The coffee machine (2) according to claim 1, wherein the collection tray (1) is configured so that, when the collection tray (1) is introduced for electrical and hydraulic connection to the coffee machine (2), and the hydraulic connector (8) is connected to the water/steam discharge conduit (40), the electrical conductors (13) find positional alignment for connection with said electrical contacts (15) of said electric circuit (16) through positioning of the oscillating support (14).

17. The coffee machine (2) according to claim 1, wherein the hydraulic connector (8) is integrated directly into a frame (20) of the collection tray (1).

18. A coffee machine (2) comprising a collection tray (1) for discharged liquid/steam of the coffee machine (2), the collection tray (1) comprising:

a primary collection compartment (10), a secondary collection compartment (11), smaller in volume than the primary collection compartment (10), where all liquid drainage and drippings of the coffee machine (2) first enter the primary collection compartment (10), an overflow (12) of said primary collection compartment (10) for discharging the liquid into the secondary collection compartment (11), a hydraulic connector (8) configured for sealed connection with a water/steam discharge conduit (40) of the coffee machine (2), and at least two electrical conductors (13) positioned in said secondary collection compartment (11) and assembled on an oscillating support (14) for connection with two electrical contacts (15) of an external electric circuit (16) for detecting a level of liquid contained in said secondary collection compartment (11);

wherein the oscillating support (14) is configured for vertical oscillation to enable a position of the two electrical conductors (13) to be movable relative to a position of the hydraulic connector (8);

wherein the primary collection compartment (10), the secondary collection compartment (11), and the overflow (12) are configured so that:

upon liquid reaching a predetermined level in the primary collection compartment (10), the liquid starts to overflow from the overflow (12) into the secondary collection compartment (11); and upon liquid reaching a predetermined level in the secondary collection compartment (11), the two electrical conductors (13) are contacted by the liquid, which closes the electric circuit (16); and wherein the collection tray (1) is configured so that, when the collection tray (1) is introduced for electrical and hydraulic connection to the coffee machine (2), and the hydraulic connector (8) is connected to the water/steam discharge conduit (40), the electrical conductors (13) find positional alignment for connection with said electrical contacts (15) of said electric circuit (16) through positioning of the oscillating support (14).

\* \* \* \* \*